US012117362B2

(12) United States Patent
Ricci et al.

(10) Patent No.: US 12,117,362 B2
(45) Date of Patent: Oct. 15, 2024

(54) METHOD FOR VALIDATING A HOMOGENIZING VALVE

(71) Applicant: GEA MECHANICAL EQUIPMENT ITALIA S.P.A., Parma (IT)

(72) Inventors: Alfredo Ricci, Parma (IT); Silvia Grasselli, Parma (IT); Giovanni Gasparelli, Parma (IT); Vincenzo Diraimondo, Parma (IT)

(73) Assignee: GEA MECHANICAL EQUIPMENT ITALIA S.P.A., Parma (IT)

( * ) Notice: Subject to any disclaimer, the term of this patent is extended or adjusted under 35 U.S.C. 154(b) by 506 days.

(21) Appl. No.: 17/594,919

(22) PCT Filed: Jan. 28, 2021

(86) PCT No.: PCT/IB2021/050673
§ 371 (c)(1),
(2) Date: Nov. 3, 2021

(87) PCT Pub. No.: WO2021/198794
PCT Pub. Date: Oct. 7, 2021

(65) Prior Publication Data
US 2022/0404233 A1    Dec. 22, 2022

(30) Foreign Application Priority Data
Apr. 3, 2020    (IT) .................. 102020000007159

(51) Int. Cl.
*G01M 13/003*    (2019.01)
*B01F 23/41*    (2022.01)
(Continued)

(52) U.S. Cl.
CPC ....... *G01M 13/003* (2019.01); *B01F 23/4105* (2022.01); *B01F 25/1051* (2022.01); *C09K 23/34* (2022.01)

(58) Field of Classification Search
CPC .............. G01M 13/003; B01F 23/4105; B01F 25/1051; C09K 23/34; C09K 23/00;
(Continued)

(56) References Cited

U.S. PATENT DOCUMENTS

2015/0298074 A1*  10/2015  Ricci ................... B01F 25/4422
                                                    366/182.4
2020/0085710 A1*  3/2020   Denda ..................... A61K 8/37

OTHER PUBLICATIONS

Ulrich Ahlers, "Almost Transparent Emulsion", CIT Plus, vol. 22. No. 6, Jun. 1, 2019, pp. 35-36, XP055758894.
(Continued)

*Primary Examiner* — Robert S Jones, Jr.
*Assistant Examiner* — Jiangtian Xu
(74) *Attorney, Agent, or Firm* — PEARNE & GORDON LLP

(57) ABSTRACT

A method for validating a homogenizing valve (1), comprising the steps of:—preparing an emulsion having a hydrophilic phase comprising, in weight percentage on the total weight: from 55% to 74% demineralized water, from 10% to 20% glycerin and from 3% to 4,2% butylene glycol, and a lipophilic phase comprising, in weight percentage on the total weight: from 5.1% to 5.9% squalane, from 7.2% to 8.8% caprylic acid alkyl ester and from 0.665% to 0.735% cetyl alcohol;—subjecting the emulsion to forced passage within the homogenizing valve (1) from a high pressure zone (HP) to a low pressure zone (LP) a plurality of times.

7 Claims, 3 Drawing Sheets

(51) Int. Cl.
*B01F 25/00* (2022.01)
*C09K 23/34* (2022.01)

(58) Field of Classification Search
CPC ...... C09K 23/003; C09K 23/017; A61K 8/31;
A61K 8/342; A61K 8/345; A61K 8/37;
A61K 9/107; A61K 47/06; A61K 47/10;
A61K 47/14; G01N 1/28; G01N 1/38
See application file for complete search history.

(56) References Cited

OTHER PUBLICATIONS

Anonymous, "New Era for Emulsion Homogenisation", Pharmatechnik-Online, Jun. 6, 2019, pp. 1-3, XP055758745.
Andreas Ha Kansson, et al., "Experimental Validation of RANS-CFD on a High-Pressure Homogenizer Valve", Chemical Engineering Science, Oxford, GB, vol. 71, Dec. 22, 2011, pp. 264-273, XP028398104.
"Homogenised Personal Care Emulsions", Research Disclosure, Kenneth Mason Publications, Hampshire, UK, No. 436, Aug. 1, 2000, pp. 1-3, XP000991801.

* cited by examiner

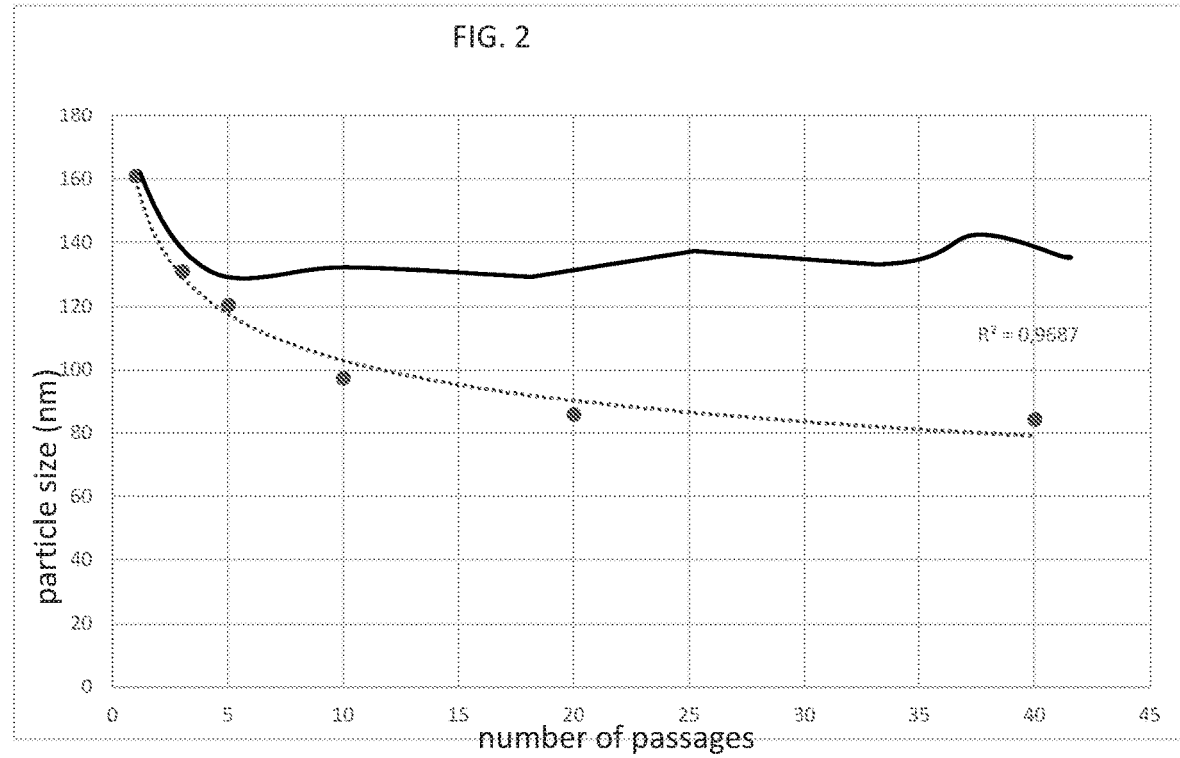

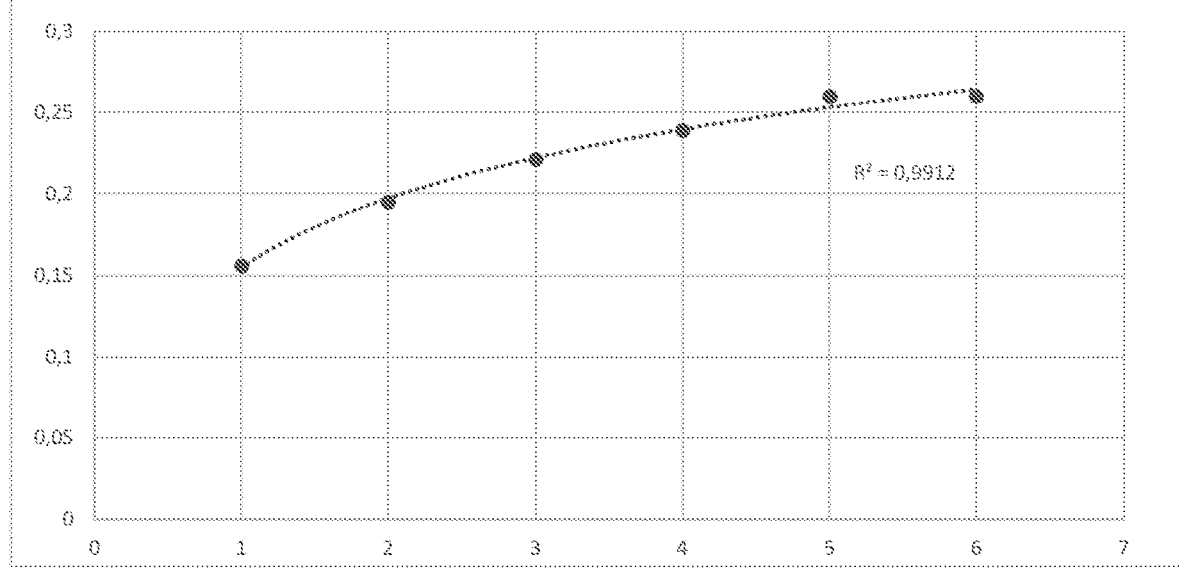

METHOD FOR VALIDATING A HOMOGENIZING VALVE

TECHNICAL FIELD

The present invention relates to a method for validating a homogenizing valve.

The invention proposed here is used in the food industry, in particular in the dairy sector, or in the chemical, pharmaceutical or cosmetic industry. The invention can also be used in manufacturing areas where homogenization is a step of the production process. Consider, for example, the production of carbon-based nanostructured materials, such as graphene and carbon nanotubes or cellular breakdown of yeasts, algae or microorganisms for the production of intracellular material.

BACKGROUND ART

Even though in varying, currently known embodiments, a homogenizing apparatus comprises a high-pressure pump and a homogenizing valve which acts on the fluid products in order to:
- crush the particles of the fluid to make their dimensions uniform, reducing the average size and the variance of the distribution in order to stabilize the product and to increase its shelf-life in the case of emulsions;
- break the cell membranes in order to facilitate the extraction of the active ingredients in the case of pharmaceutical applications;
- modify the structure of the particles in the case of chemical applications and cellulose or unicellular organisms.

For most products, the main parameters defining the level of homogenization are the average particle size and standard deviation.

In accordance with a known solution, the homogenizing valve, placed downstream of the piston pump, comprises a first chamber receiving the fluid at high pressure from the pump delivery and a second chamber capable of supplying outgoing homogenized fluid at low pressure. The homogenizing action is obtained by forcing the fluid to pass through an interspace with reduced dimensions obtained between the first and the second chamber.

Both single-stage and double-stage homogenizer architectures are known. To date, the testing of a homogenization apparatus before installation consists of a mechanical and electrical test.

Water is recirculated in the homogenizing valve, thus it is not possible to verify the actual ability to reach the operating pressure for which the valve was designed.

DISCLOSURE OF THE INVENTION

In this context, the object of the present invention is to propose a method for validating a homogenizing valve which overcomes the problems of the prior art cited above.

In particular, the object of the present invention is to propose a method for validating a homogenizing valve which allows to verify the effective homogenization capacity of the valve, i.e., the ability to crush the particles of a fluid, making its dimensions uniform.

A further object of the present invention is to provide a method for validating a homogenizing valve which is rapid and easily performed by operators.

The stated technical task and specified objects are substantially achieved by a method for validating g a homogenizing valve, comprising the steps of:

preparing an emulsion having a hydrophilic phase comprising, in weight percentage on the total weight: from 55% to 74% demineralized water, from 10% to 20% glycerin and from 3% to 4.2% butylene glycol, and a lipophilic phase comprising, in weight percentage on the total weight: from 5.1% to 5.9% squalane, from 7.2% to 8.8% caprylic acid alkyl ester and from 0.665% to 0.735% cetyl alcohol;

subjecting the emulsion to forced passage within the homogenizing valve from a high pressure zone to a low pressure zone a plurality of times.

In accordance with an aspect of the invention, the lipophilic phase of the emulsion further comprises, in weight percentage on the total weight: from 1.9% to 2.1% stearic acid and from 4.75% to 7.2% polyglyceryl-3 methyl glucose distearate.

In accordance with an aspect of the invention, the lipophilic phase of the emulsion further comprises, in weight percentage on the total weight: from 1.9% to 2.1% stearic acid and from 4.75% to 7.2% distearate ester of triglycerol.

In accordance with an aspect of the invention, the lipophilic phase of the emulsion further comprises, in weight percentage on the total weight: from 4.75% to 7.2% distearate ester of triglycerol.

In accordance with an aspect of the invention, the lipophilic phase of the emulsion further comprises, in weight percentage on the total weight: from 4.75% to 7.2% polyglyceryl-3 methyl glucose distearate.

In accordance with an aspect of the invention, the lipophilic phase of the emulsion further comprises, in weight percentage on the total weight: from 1.0% to 1.1% triethanolamine.

In accordance with an aspect of the invention, the emulsion is subjected to forced passage within the homogenizing valve from 15 to 20 times. In accordance with an aspect of the invention, a step is further provided of heating the emulsion at a temperature comprised between 20° C. and 80° C. before subjecting it to the forced passage within the homogenizing valve.

BRIEF DESCRIPTION OF DRAWINGS

Further features and advantages of the present invention will appear more clearly from the indicative, and therefore non-limiting, description of a preferred but not exclusive embodiment of a method for validating a homogenizing valve, as illustrated in the drawings, in which:

FIG. 2 is a graph illustrating the effect of the forced passage of the emulsion according to the validating method proposed herein, as compared to a generic emulsion;

FIG. 3 is a graph illustrating the standard deviation of the emulsion conceived herein.

DETAILED DESCRIPTION OF PREFERRED EMBODIMENTS OF THE INVENTION

Figure 1:
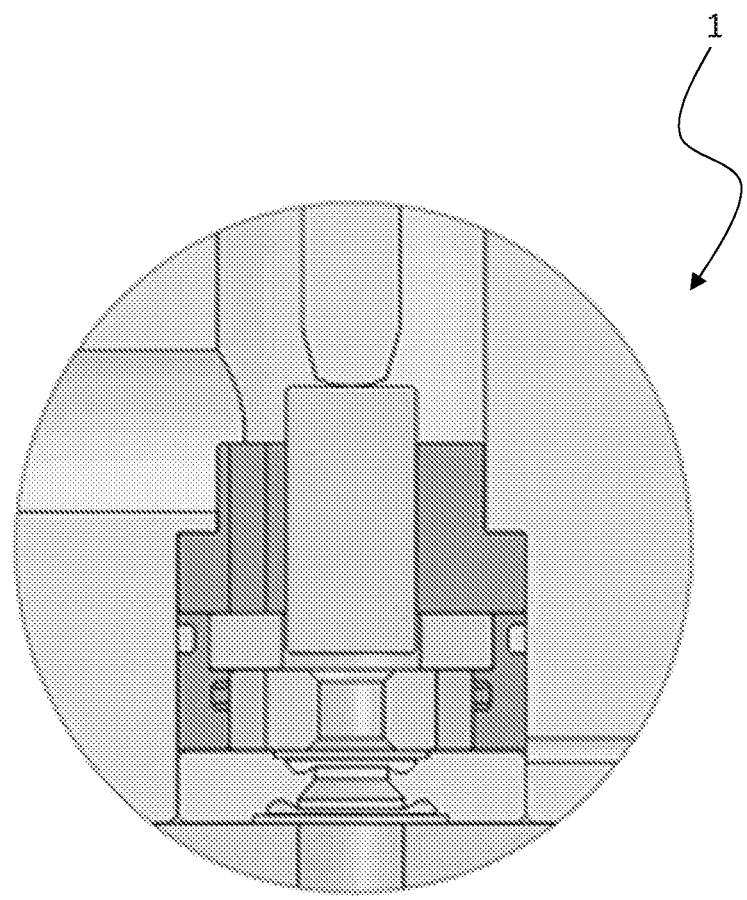
FIG. 1 illustrates a homogenizing valve which can be subjected to a validating method in accordance with the present invention.

The validating method developed herein involves first preparing an emulsion. As is known, an emulsion comprises a hydrophilic phase and a lipophilic phase.

The hydrophilic phase comprises, in weight percentage on the total weight:
from 55% to 74% demineralized water;
from 10% to 20% glycerin;
from 3% to 4.2% butylene glycol.

The lipophilic phase comprises, in weight percentage on the total weight:
- from 5.1% to 5.9% squalane;
- from 7.2% to 8.8% caprylic acid alkyl ester;
- from 0.665% to 0.735% cetyl alcohol.

The lipophilic phase comprises, in weight percentage on the total weight:
- from 5.1% to 5.9% squalane;
- from 7.2% to 8.8% caprylic acid alkyl ester;
- from 0.665% to 0.735% cetyl alcohol;
- from 1.9% to 2.1% stearic acid;
- from 4.75% to 7.2% polyglyceryl-3 methyl glucose distearate.

In accordance with another embodiment, the lipophilic phase comprises, in weight percentage on the total weight:
- from 5.1% to 5.9% squalane;
- from 7.2% to 8.8% caprylic acid alkyl ester;
- from 0.665% to 0.735% cetyl alcohol;
- from 1.9% to 2.1% stearic acid;
- from 4.75% to 7.2% distearate ester of triglycerol.

In accordance with another embodiment, the lipophilic phase comprises, in weight percentage on the total weight:
- from 5.1%, to 5.9% squalane;
- from 7.2% to 8.8% caprylic acid alkyl ester;
- from 0.665% to 0.735% cetyl alcohol;
- from 4.75% to 7.2% distearate ester of triglycerol.

In accordance with another embodiment, the lipophilic phase comprises, in weight percentage on the total weight:
- from 5.1% to 5.9% squalane;
- from 7.2% to 8.8% caprylic acid alkyl ester;
- from 0.665% to 0.735% cetyl alcohol;
- from 4.75% to 7.2% polyglyceryl-3 methyl glucose distearate.

In accordance with another embodiment, the lipophilic phase comprises, in weight percentage on the total weight:
- from 5.1% to 5.9% squalane;
- from 7.2% to 8.8% caprylic acid alkyl ester;
- from 0.665% to 0.735% cetyl alcohol;
- from 1.9% to 2.1% stearic acid;
- from 4.75% to 7.2% distearate ester of triglycerol;
- from 1.0% to 1.1% triethanolamine.

In accordance with another embodiment, the lipophilic phase comprises, in weight percentage on the total weight:
- from 5.1% to 5.9% squalane;
- from 7.2% to 8.8% caprylic acid alkyl ester;
- from 0.665% to 0.735% cetyl alcohol;
- from 1.0% to 1.1% triethanolamine.

In accordance with another embodiment, the lipophilic phase comprises, in weight percentage on the total weight:
- from 5.1% to 5.9% squalane;
- from 7.2% to 8.8% caprylic acid alkyl ester;
- from 0.665% to 0.735% cetyl alcohol;
- from 1.9% to 2.1% stearic acid;
- from 4.75% to 7.2% polyglyceryl-3 methyl glucose distearate;
- from 1.0% to 1.1% triethanolamine.

Once prepared, the emulsion is forcibly passed within a homogenizing valve, indicated by the number 1 in FIG. 1, from a high pressure zone HP to a low pressure zone LP.

In particular, the emulsion is forcibly passed in the homogenizing valve 1 a plurality of times.

Such a forced passage can be carried out in recirculation or through separate passages. Between one passage and another, a stop may also be provided.

The number of passages depends on the specific validation.

In accordance with an embodiment of the method, the forced passage in the homogenizing valve 1 occurs from 15 to 20 times.

In accordance with an aspect of the invention, the emulsion is heated to a temperature comprised between 20° C. and 80° C. before the forced passage.

All the above emulsion recipes have been used to validate a double-stage homogenization apparatus, with heat exchanger and operating at a maximum pressure of 1000 bar.

From the results obtained it has been noted that, as the number of forced passages in the homogenizing valve increases, the emulsion becomes increasingly transparent and translucent. This allows to immediately detect the homogenization effectiveness of the apparatus (i.e., of the valve).

The validating method can be used for any homogenizing valve. The only difference lies in the amount of emulsion needed to implement the method, which varies as a function of the type of valve.

Among the various emulsion compositions indicated above, the following allows a good reduction of particles to be obtained: the hydrophilic phase is always the same while the lipophilic phase comprises, in weight percentage on the total weight:
- from 5.1% to 5.9% squalane;
- from 7.2% to 8.8% caprylic acid alkyl ester;
- from 0.665% to 0.735% cetyl alcohol;
- from 1.9% to 2.1% stearic acid;
- from 4.75% to 7.2% distearate ester of triglycerol.

Among the various emulsion compositions indicated above, the following is the one which allows a more marked reduction in particle size compared to the other variants, and to have a lower viscosity: the hydrophilic phase is always the same while the lipophilic phase comprises, in weight percentage on the total weight:
- from 5.1% to 5.9% squalane;
- from 7.2% to 8.8% caprylic acid alkyl ester;
- from 0.665% to 0.735% cetyl alcohol;
- from 1.9% to 2.1% stearic acid;
- from 4.75% to 7.2% polyglyceryl-3 methyl glucose distearate;
- from 1.0% to 1.1% triethanolamine.

This emulsion composition is considered optimal compared to all the others.

The emulsion conceived, in the different embodiments thereof, allows for an effective homogenization within a broader working range with respect to a "generic" emulsion.

This property is illustrated in FIG. 2 showing curves on a graph in which the abscissa indicates the number of forced passages in the homogenizing valve and the ordinate indicates the particle size in nm.

The curve related to the generic emulsion is the continuous line. Such an emulsion comprises water (80.5%), sunflower oil (15%) and a combination of two surfactants: Tween 80 (polysorbate 80, having the formula $C_{64}H_{124}O_{26}$ at 2.45%) and the commercial surfactant TEGO® SMO 80 (2.05%).

The curve related to the emulsion proposed herein is the dotted line. The emulsion composition chosen is the optimal one identified above.

Comparing the two curves, it can be noted that:
- with the same number of passages in the same homogenizing valve, the emulsion conceived results in a greater reduction in particle size than the generic emulsion;
- the emulsion conceived allows to obtain a target final particle size with fewer passages.

The emulsion conceived allows to visually evaluate the quality and degree of homogenization related to the operating conditions used.

Given the greater width of the work area, in terms of particle size (in the example it ranges from 80 nm to 160 nm), the emulsion conceived allows to better discriminate two close working points with respect to the generic emulsion.

For the preparation of the emulsion proposed here, some commercial products can be used, such as:

TEGO® Care 450 (polyglyceryl-3 methyl glucose distearate);

CREMOPHOR® GS 32 (distearate ester of triglycerol).

From the description provided, the features of the method for validating a homogenizing valve according to the present invention are clear, as are the advantages.

In particular, the proposed validating method allows to verify the actual homogenizing capacity of the valve. This is not merely a mechanical and/or electrical functional test, but a test which simulates realistic operating conditions since the parameters of the homogenized emulsion are evaluated.

Thereby, a homogenizer which meets high quality standards and has greater reliability is made available to the end user.

The specific composition proposed here for the emulsion (with the variants thereof) allows the development of a universal validating method, i.e., which can be used for any type of homogenizing valve. In fact, it is sufficient to vary the amount of emulsion as a function of the features of the homogenizing valve.

Furthermore, the validating method proposed here is complete and reliable, i.e., it does not require confirmation from other tests.

Furthermore, the homogenization efficacy is quickly and easily verifiable to the naked eye of operators since the emulsion homogenized effectively is transparent, stable and translucent.

Furthermore, the emulsion proposed here results in a reduction in particle size with fewer passages with respect to other emulsions on the market (with evident energy savings) or, with the same number of passages, results in smaller particle sizes.

The proposed validating method is reliable and cost-effective, as it is based on a stable, low-viscosity and low-cost emulsion.

The invention claimed is:

1. Method for validating a homogenizing valve (1), comprising the steps of:
    preparing an emulsion having a hydrophilic phase comprising, in weight percentage on the total weight: from 55% to 74% demineralized water, from 10% to 20% glycerin and from 3% to 4.2% butylene glycol, and a lipophilic phase comprising, in weight percentage on the total weight: from 5.1% to 5.9% squalane, from 7.2% to 8.8% caprylic acid alkyl ester and from 0.665% to 0.735% cetyl alcohol;
    subjecting said emulsion to forced passage within said homogenizing valve (1) from a high pressure zone (HP) to a low pressure zone (LP) from 15 to 20 times.

2. Method according to claim 1, wherein the lipophilic phase of said emulsion further comprises, in weight percentage on the total weight: from 1.9% to 2.1% stearic acid and from 4.75% to 7.2% polygliceryl-3 methyl glucose distearate.

3. Method according to claim 1, wherein the lipophilic phase of said emulsion further comprises, in weight percentage on the total weight: from 1.9% to 2.1% stearic acid and from 4.75% to 7.2% distearate ester of triglycerol.

4. Method according to claim 1, wherein the lipophilic phase of said emulsion further comprises, in weight percentage on the total weight: from 4.75% to 7.2% distearate ester of triglycerol.

5. Method according to claim 1, wherein the lipophilic phase of said emulsion further comprises, in weight percentage on the total weight: from 4.75% to 7.2% polyglyceryl-3 methyl glucose distearate.

6. Method according to claim 1, wherein the lipophilic phase of said emulsion further comprises, in weight percentage on the total weight from 1.0% to 1.1% triethanolamine.

7. Method according to claim 1, further comprising a step of heating the emulsion at a temperature comprised between 20° C. and 80° C. before subjecting it to the forced passage within said homogenizing valve (1).

* * * * *